(12) United States Patent
Moscinski et al.

(10) Patent No.: US 9,105,896 B2
(45) Date of Patent: Aug. 11, 2015

(54) METAL RINGS FOR ACTIVE BRAZING IN SODIUM-BASED THERMAL BATTERIES

(71) Applicant: GENERAL ELECTRIC COMPANY, Schenectady, NY (US)

(72) Inventors: Michael Colan Moscinski, Niskayuna, NY (US); Badri Narayan Ramamurthi, Niskayuna, NY (US); Sundeep Kumar, Bangalore (IN); Mohamed Rahmane, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 293 days.

(21) Appl. No.: 13/729,134

(22) Filed: Dec. 28, 2012

(65) Prior Publication Data

US 2014/0186690 A1 Jul. 3, 2014

(51) Int. Cl.
 *H01M 2/04* (2006.01)
 *H01M 2/08* (2006.01)
 *H01M 10/39* (2006.01)

(52) U.S. Cl.
 CPC ............... *H01M 2/08* (2013.01); *H01M 10/39* (2013.01); *Y10T 29/4911* (2015.01)

(58) Field of Classification Search
 CPC ...... H01M 2/00; H01M 2/08; H01M 2/02524
 USPC ....................................................... 429/185
 See application file for complete search history.

(56) References Cited

U.S. PATENT DOCUMENTS

| 4,105,834 | A | * | 8/1978 | Baker et al. .................. 429/104 |
| 4,112,204 | A | * | 9/1978 | McRae ......................... 429/181 |
| 5,009,357 | A | | 4/1991 | Baker et al. |
| 5,161,908 | A | | 11/1992 | Yoshida et al. |
| 5,163,770 | A | | 11/1992 | Soma et al. |

(Continued)

FOREIGN PATENT DOCUMENTS

| JP | 06243890 A | 9/1994 |
| JP | 2003288867 A | 10/2003 |

(Continued)

OTHER PUBLICATIONS

Tinsley et al; "The Reduction of Residual Stress Generated in Metal-Ceramic Joining," Materials and Manufacturing Processes, vol. 13, Issue 4, pp. 491-504, 1998.

(Continued)

*Primary Examiner* — Kenneth Douyette
*Assistant Examiner* — James Lee
(74) *Attorney, Agent, or Firm* — Francis T. Coppa

(57) ABSTRACT

The present application provides for metal rings and ceramic collars for active brazing in sodium-based thermal batteries. The metal rings may be outer and inner Ni rings configured for sealing to an alpha-alumina collar via active brazing for use in NaMx cells. The inner and outer Ni metal rings may be sealed to differing portions of the alpha-alumina collar. The portions of the outer and inner Ni rings active brazed to the alpha-alumina collar may define a tapered thickness that reduces internal stresses at the active brazed joints resulting from differing coefficients of thermal expansion between the Ni metal rings and the alpha-alumina collar. The portions of the outer and inner Ni rings and alpha-alumina collar sealed by active brazing, and thereby the active braze joints themselves, may be oriented to control or dictate the stresses on the joints during use.

17 Claims, 11 Drawing Sheets

(56) References Cited

U.S. PATENT DOCUMENTS 5,351,874 A    10/1994   Rajner et al.
7,544,275 B2   6/2009    Lamaze

FOREIGN PATENT DOCUMENTS

WO    996659 A1    12/1999
WO    9965642 A1   12/1999

OTHER PUBLICATIONS

Zhang et al; Effect of Residual Stress on the Strength of an Alumina-Steel Joint by Partial Transient Liquid Phase (PTLP) Brazing, vol. 122, Issue 2-3, pp. 220-225, Mar. 28, 2002.

Galli et al; Relief of the Residual Stresses in Ceramic-Metal Joints by a Layered Braze Structure, Advanced Engineering Materials, vol. 8, Issue 3, pp. 197-201, Mar. 2006.

* cited by examiner

METAL RINGS FOR ACTIVE BRAZING IN SODIUM-BASED THERMAL BATTERIES

BACKGROUND

The present disclosure generally relates to metal rings for active brazing to ceramic collars in sodium-based thermal batteries, and methods of active brazing metal rings to ceramic collars in sodium-based thermal batteries.

High-temperature rechargeable batteries, such as sodium-based thermal batteries like sodium metal halide or sodium sulfur cells, typically have a number of components that need to be sealed for the cell to work. Sodium metal halide (NaMx) batteries, for instance, may include cells including a sodium metal anode and a metal halide (NiCl2 for example) cathode. A beta"-alumina solid electrolyte (BASE) separator can be used to separate the anode and cathode. The solid electrolyte may allow the transport of sodium ions between anode and cathode. A secondary electrolyte (NaAlCl4) can also used in the cathode mixture. The cathode mixture typically consists of nickel and sodium chloride along with other additives. The cathode mixture is contained inside the BASE tube, which is closed on one end.

In present typical design of NaMx cells, the open end of the beta"-alumina ceramic tube is joined to an alpha-alumina collar using a glass seal. Spinel, zirconia, yttria, or other ceramic insulators, or combinations thereof, may also be used as a collar material in NaMx cells. The alpha-alumina collar isolates electrically the anode from the cathode. In order to enable the welding of this ceramic subassembly to the metallic current collectors (anode and cathode), two metallic rings (typically Ni) are coupled or otherwise bonded to the alpha-alumina collar prior to the sealing glass operation. The inside metal ring is typically welded to the cathode current collector and the outside metal ring is typically welded to the anode current collector (e.g., the battery case). The integrity of these two metal-ceramic joints is critical for the reliability and safety of the NaMx cell.

The coupling of the metal (e.g., Ni) rings and ceramic (e.g., alpha-alumina) collar is typically achieved with two main process steps: (1) metallization of the alpha-alumina collar; and (2) thermal compression bonding (TCB) of both Ni rings to the metalized ceramic collar. Generally speaking, the first process step of metalizing the alpha-alumina collar provides bond (e.g., a glass bond) between a pure Mo metallization layer and the alumina collar, and the second process step of TCB provides a diffusion bond between the Mo in the metallization layer and the Ni of the inner and outer rings.

As mentioned above, to be able to join a Ni ring via a TCB to an alpha-alumina collar in a NaMx cell, it is necessary to initially metalize the alumina. Without the metallization, it is difficult to create a metallurgical bond during the TCB process between the Ni ring and the alpha-alumina collar. Metalizing of alumina has been practiced since the late 1940's, with the Mo—Mn process being the most studied and the most widely commercialized metallization process for alpha-alumina. In the process, the paste material is applied to alumina typically via screen printing, and heated treated (e.g., about 1500 degrees C. to about 1600 degrees C.) with wet hydrogen to bond the Mo to the alumina. During the heating process glass flows from the debased alumina into the Mo layer, and the wet hydrogen promotes the wicking and wetting of the glassy phase in the alumina into the Mo layer. However, in a NaMx cell Mn is incompatible with the chemistry used in the cell and is highly susceptible to corrosion. It is therefore necessary to use a metallization process that uses only a 100% Mo paste. Unfortunately, using 100% Mo makes the metallization process more difficult and narrows the process window by significantly restricting the operating ranges of common processing variables, temperature, dew point, and glass composition. Thereby, metallization of an alpha-alumina collar in a NaMx cell is difficult, time consuming and expensive.

However, once formed, the Mo metallization layer provides a metal surface for the bonding of the Ni rings to the alpha collar. As mentioned above, the Mo layer is a composite comprised of two interlaced phases-Mo and glass. The subsequent thermal compression bonding (TCB) step is the formation of a metallurgical bond between the Ni ring and Mo metalized layer on the alpha-alumina collar. Specifically, the bond is created by heating the Ni rings and metalized alumina collar while they are in contact and relatively high pressure is applied to the joints therebetween. To create a sufficient bond, the Ni rings and metalized alumina collar must be subjected to relatively high temperatures (e.g., at least about 950 degrees C.), for relatively long periods of time (e.g., at least about 45 minutes) and while subjected to a significant load (e.g., at least about 750 kg force). Further, each Ni ring and alumina collar subassembly must be individually arranged or processed such that the Ni rings are properly located on the alumina collar and the compression load is applied to the joint between the Ni rings and alumina collar. The TCB process is a batch-process and requires large investments to produce large number of parts. Thereby, the TCB process is also time consuming, not-scalable and expensive.

Although the metallization and TCB process is difficult, time consuming and expensive, it is the typical process to bond Ni rings and alpha-alumina collars in NaMx cells due to the relatively high bond strength achieved thereby. In fact, the main advantage or CTQ (Critical to Customer) parameter of the metallization and TCB sub-assembly is the metal-to-ceramic bond strength achieved between the Ni rings and the alpha-alumina collar, along with hermeticity of the bond. Typically, the metal-to-ceramic bond between the Ni rings and the alpha-alumina collar are tested by a peel test which subjects the metal-ceramic bond to a tensile stress until failure while the load-to-failure variable is measured. While the tensile strength of the metal-to-ceramic bonds are important (such as to sufficiently withstand internal pressures present during the operation of NaMx cell batteries), it is noted that the tensile strength of the bonds is used as an overall strength indication of bonds (i.e., ability to withstand tensile and other forces present during the operation and lifespan of NaMx cell batteries).

The strength of the TCB bond on both the inner and outer rings is controlled by a wide range of variables inherent to the components of the TCB subassembly. The microstructure of the alpha-alumina collar and the Mo metallization, along with the TCB process, heavily influence the final strength of the metal-to-ceramic bond. With upwards of forty different processing steps needed to manufacture the TCB subassembly, it is necessary to develop a quality control plan for all components of the subassembly to ensure sufficient bond strength. Again, the process to achieve the TCB subassembly (metalized alumina collar and TCB collar and Ni rings) is thereby difficult to achieve, not scalable, expensive and time consuming. As a result, to advantageously avoid the difficulties, expense and time associated with the metallization and TCB process typically associated with the manufacturing of NaMx cells, alternate joining technologies for the Ni rings and alpha-alumina collar that achieve sufficient bond strength are necessary.

One potential alternative joining technology or process for bonding Ni rings and an alpha-alumina collar in NaMx cells is active brazing. For example, active brazing the Ni rings and the alpha-alumina collar may be capable of reducing NaMx battery costs by at least two dollars per cell as compared to current metallization and TCB technologies or processes.

Active brazing metal-ceramic joints is a procedure in which one of the components from a braze alloy reacts with the ceramic and forms an interfacial bond. Conventionally, brazing is done through metallization in combination with a braze alloy. One primary requirement of braze alloys for use in high temperature rechargeable batteries, such as NaMx batteries, is a high corrosion resistance towards sodium and halide. Active brazing has been known to join ceramic to metal, but there are not many commercially available active braze alloys (ABAs) suitable for use in NaMx cells. Specifically, high temperature ABAs (e.g., 900-1200 degrees C.) and ABAs resistant to corrosion from sodium and halide, as required for use in NaMx cells, are in short order. Further, due to the high temperatures present during active brazing in NaMx cells and the significant mismatch of the coefficient of thermal expansions of the Ni rings and the alpha-alumina collar, the typical bond strengths (e.g., tensile strength) achieved with prior art Ni rings and alpha-alumina collar designs by active brazing even with suitable ABAs are commonly insufficient (i.e., sufficient bond strength is difficult to achieve by active brazing prior art Ni rings and alpha-alumina collar designs).

There continues to be a growing need in the art for high performance metal halide batteries with lower fabrication costs. Thus, Ni rings and alpha-alumina collar designs capable of being bonded or sealed via active brazing that exhibit sufficient bond strength (i.e., is capable of achieving typical NaMx battery performance) is desirable. For example, Ni rings and alpha-alumina collar designs effective in producing relatively minor residual stresses via active brazing on the alumina collar due to the thermal expansion mismatch between ceramic collar and the Ni rings are advantageous. As another example, Ni rings and alpha-alumina collar designs effective in increasing bond strength (e.g., gaining a mechanical or structural advantage) between ceramic collar and the Ni rings at least in the tensile direction are advantageous. Such improved Ni rings and alpha-alumina collar designs for active brazing should provide for bond strengths at least comparable to bond strengths achieved with conventional metallization and TCB processes, reduce manufacturing costs compared with conventional metallization and TCB processes and/or reduce manufacturing times compared with conventional metallization and TCB processes.

BRIEF DESCRIPTION

In accordance with one aspect of the present disclosure, a sub-assembly for at least partially sealing a cell of a sodium-based thermal battery is disclosed. The sub-assembly may include an outer metal ring, an inner metal ring and a ceramic collar. The outer metal ring may define a first aperture and include a first portion and a second portion. The second portion may define a length and a thickness that varies along the length. The inner metal ring may define second aperture that is smaller than the first aperture of the outer metal ring and may include a third portion and a fourth portion. The fourth portion may define a length and a thickness that varies along the length. The ceramic collar may define a third aperture and include a first surface and a second surface. In some embodiments, at least a portion of the second portion of the outer metal ring may be joined to the first surface of the ceramic collar by active brazing, and at least a portion of the fourth portion of the inner metal ring may be joined to the second surface of the ceramic collar by active brazing. In some embodiments, the ceramic collar substantially may electrically insulate the outer and inner metal rings.

In accordance with other aspect of the present disclosure, a sodium-based thermal battery including an electrically conductive case and at least one cell with a cathode current collector assembly is disclosed. The battery may include an outer metal ring, an inner metal ring and a ceramic collar. The outer metal ring may define a first aperture and include a first portion and a second portion. The first portion may be operably electrically coupled to the case. The second portion 224 may define a length and a thickness that varies along the length. The inner metal ring may define a second aperture that is smaller than the first aperture of the outer metal ring and may include a third portion and a fourth portion. The third portion may be operably electrically coupled to the cathode current collector assembly. The fourth portion may define a length and a thickness that varies along the length. The ceramic collar may define a third aperture and include a first surface and a second surface. In some embodiments, at least a portion of the second portion of the outer metal ring may be sealed to the first surface of the ceramic collar by active brazing. In some embodiments, at least a portion of the fourth portion of the inner metal ring may be sealed to the second surface of the ceramic collar by active brazing. In some embodiments, the ceramic collar may substantially electrically insulate the outer and inner metal rings and thereby the case and the cathode current collector assembly.

In accordance with other aspect of the present disclosure, a method of at least partially sealing a cell of a sodium-based rechargeable thermal battery including a case and a cathode current collector assembly is disclosed. The method may include obtaining an outer metal ring that defines a first aperture and includes a first portion and a second portion. The second portion may define a length and a thickness that varies along the length. The method may include obtaining an inner metal ring that defines a second aperture that is smaller than the first aperture of the outer metal ring and include a third portion and a fourth portion, the fourth portion. The fourth portion may define a length and a thickness that varies along the length. The method may include obtaining an electrically insulating ceramic collar that defines a third aperture and includes a first surface and a second surface. The method may include active brazing at least a portion of the second portion of the outer metal ring to the first surface of the ceramic collar. The method may include active brazing at least a portion of the fourth portion of the inner metal ring to the second surface of the ceramic collar. The method may include operably electrically coupling the outer metal ring to the case. The method may include operably electrically coupling the inner metal ring to the cathode current collector assembly.

These and other objects, features and advantages of this disclosure will become apparent from the following detailed description of the various aspects of the disclosure taken in conjunction with the accompanying drawings.

DRAWINGS

FIG. 1 is a perspective sectional view of a portion of a NaMx cell including prior art Ni rings and an alpha-alumina collar sealed to one another;

FIGS. 2A-B are perspective views of the sealed prior art Ni rings and alpha-alumina collar of the NaMx cell of FIG. 1;

Figure 5A:
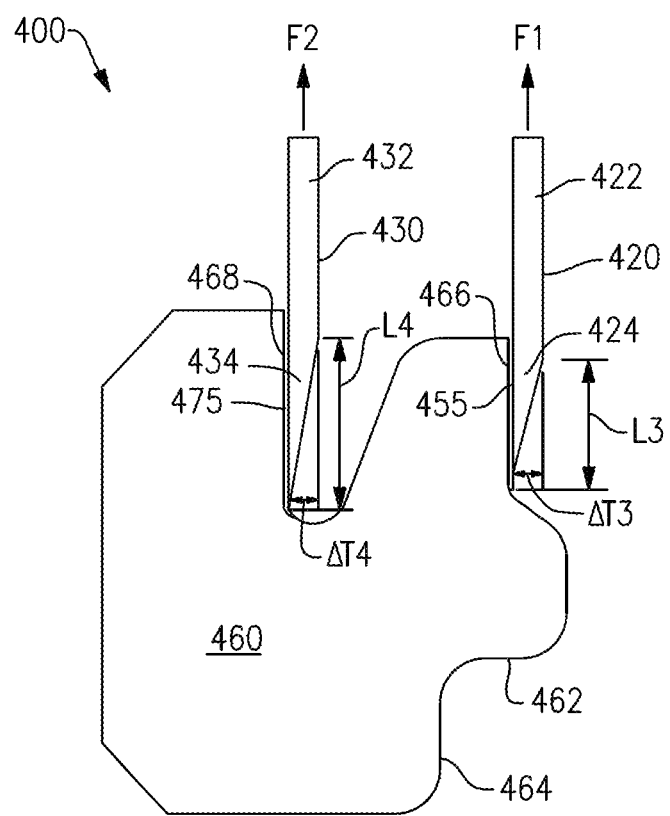
Figure 5B:
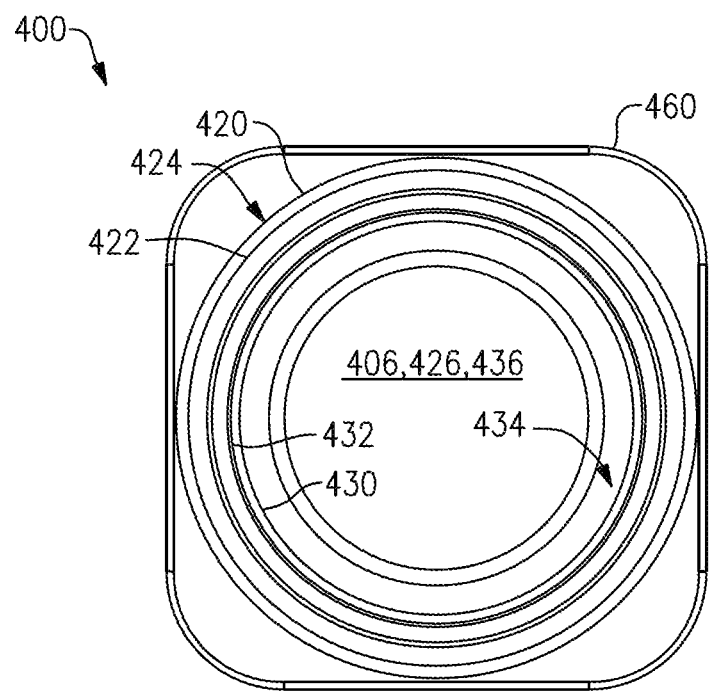
Figure 6A:
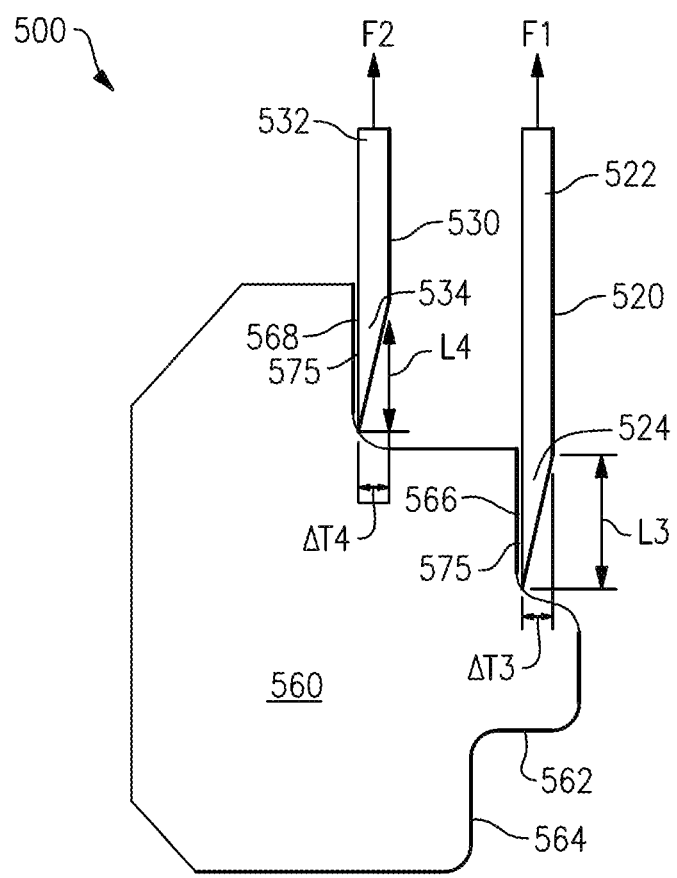
Figure 6B:
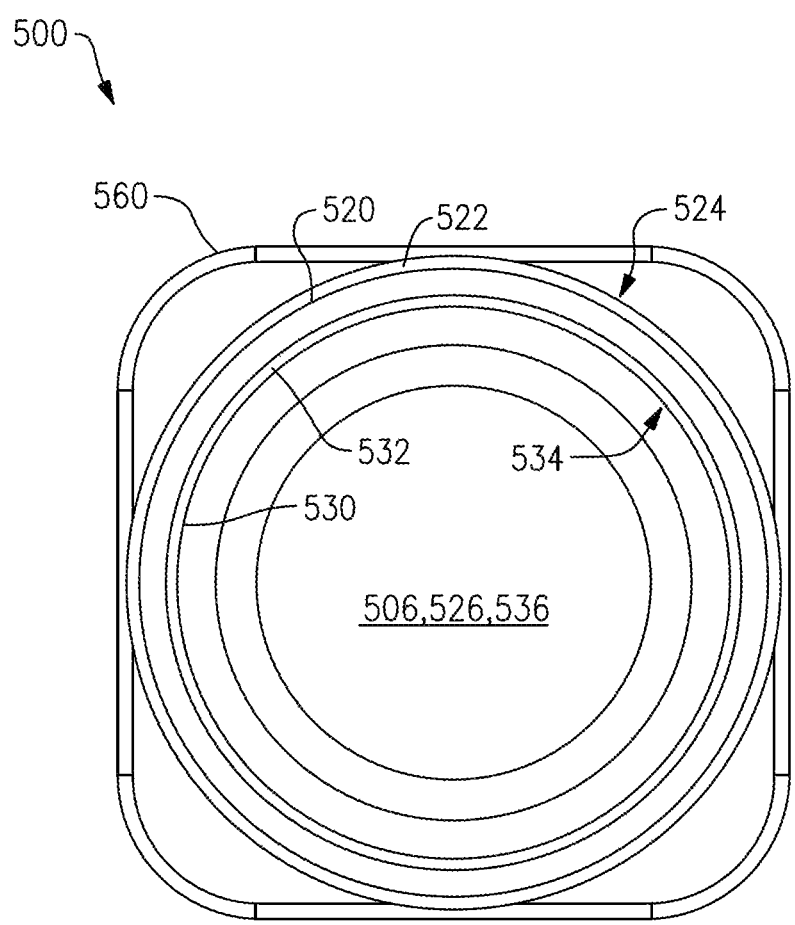

FIGS. 5A-B are a cross-sectional view and a top view, respectively, of an exemplary third embodiment of exemplary Ni outer and inner rings sealed to an exemplary alpha-alumina collar by active brazing according to the present disclosure; and FIGS. 6A-B are a cross-sectional view and a top view, respectively, of an exemplary fourth embodiment of exemplary Ni outer and inner rings sealed to an exemplary alpha-alumina collar by active brazing according to the present disclosure.

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

The disclosure includes embodiments related to components and methods of sealing portions of an electrochemical cell, for example a metal halide battery such as a sodium-based thermal battery, for instance, a sodium/sulfur or a sodium metal halide battery, by utilizing a braze alloy composition. As discussed in detail below, some of the embodiments of the present invention provide for joining an alpha-alumina ceramic insulator or collar to metal rings by utilizing a braze alloy composition. Other embodiments relate to rings configured to be bonded to an alpha-alumina collar via active brazing such that the effectuated bond strength is relatively high and sufficient for typical or expected NaMx battery performance.

In these embodiments, a braze alloy composition may be introduced between a first component (e.g., a collar) comprised of alpha-alumina and second components (e.g., rings) comprised of Ni to be joined. The first and second components may then heated to form an active braze seal (joint) between the first component and the second component(s).

In one particular embodiment, the same braze alloy composition can be used to join all components in the same heating cycle. By eliminating the need for metallization and TCB, these embodiments allow for fewer steps to be undertaken, decreasing the cost and time of the fabrication of NaMx cells. Though the present discussion provides examples in the context of a sodium-based thermal battery, such as a metal halide battery, these processes can be applied to many other applications which utilize ceramic collar and metallic ring joining.

The use of active brazing in embodiments of this disclosure has a number of benefits. First, it reduces the number of steps necessary involved with metallization of the alpha alumina collar. Secondly, it reduces the high temperature processing involved with metallization of the alpha alumina collar. Thirdly, active brazing with the improved Ni rings and alpha-alumna collar results in bond strengths at least comparable to the bond strengths that result from the metallization and TCB processes. Further, active brazing with the improved Ni rings provides a bond that is long lasting and highly reliability. Finally, active brazing is very cost effective and a relatively quick process. In short, active brazing with the improved Ni rings and alpha-alumina collar in NaMx cells decreases the number of process steps, reduces costs, decreases manufacturing time, and results in bonds that are reliable and include satisfactory performance characteristics compared to bonds resulting from the prior art metallization and TCB processes. The brazing alloys used to braze the improved Ni rings and alpha-alumna collar may be suitable for use in high temperature rechargeable batteries, compatible with the battery chemistry and able to be brazed below 1250° C.

Typically, "brazing" uses a braze material (usually an alloy) having a lower liquidus temperature than the melting points of the components (i.e. their materials) to be joined (i.e., the Ni rings and alpha-alumina collar). The braze material is brought to or slightly above its melting (or liquidus) temperature while protected by a suitable atmosphere. The braze material then flows over the components (known as wetting), and is then cooled to join the components together. As used herein, "braze alloy composition" or "braze alloy", "braze material" or "brazing alloy", refers to a composition that has the ability to wet the components to be joined, and to seal them. A braze alloy for a particular application should withstand the service conditions required and melt at a lower temperature than the base materials or melt at a very specific temperature. Conventional braze alloys usually do not wet ceramic surfaces sufficiently to form a strong bond at the interface of a joint. In addition, the alloys may be prone to sodium and halide corrosion.

As used herein, the term "brazing temperature" refers to a temperature to which a brazing structure is heated to enable a braze alloy to wet the components to be joined, and to form a brazed joint or seal. The brazing temperature is often higher than or equal to the liquidus temperature of the braze alloy. In addition, the brazing temperature should be lower than the temperature at which the components to be joined may not remain chemically, compositionally, and mechanically stable. There may be several other factors that influence the brazing temperature selection, as those skilled in the art understand.

Embodiments of the present invention utilize a braze alloy composition capable of forming a joint by "active brazing" (described below). In some specific embodiments, the composition also has high resistance to sodium and halide corrosion. In some embodiments, the braze alloy composition includes nickel and an active metal element, and further comprises a) germanium, b) niobium and chromium or c) silicon and boron. Alternatively, the braze alloy composition may comprise copper, nickel and an active metal element. Each of the elements of the alloy contributes to at least one property of the overall braze composition, such as liquidus temperature, coefficient of thermal expansion, flowability or wettability of the braze alloy with a ceramic, and corrosion resistance.

"Active brazing" is a brazing approach often used to join a ceramic to a metal or a metal alloy, or a ceramic to a ceramic. Active brazing uses an active metal element that promotes wetting of a ceramic surface, enhancing the capability of providing a seal (e.g., a hermetic seal). "Sealing", as used herein, is a function performed by a structure that joins other structures together, to reduce or prevent leakage through the joint between the other structures. The seal structure may also be referred to as a "seal." An "active metal element", as used herein, refers to a reactive metal that has higher affinity to the oxygen compared to the affinity of element in ceramic and thereby reacts with the ceramic. A braze alloy composition containing an active metal element can also be referred to as an "active braze alloy." The active metal element undergoes a decomposition reaction with the ceramic, when the braze alloy is in molten state, and leads to the formation of a thin reaction layer on the interface of the ceramic and the braze alloy. The thin reaction layer allows the braze alloy to wet the ceramic surface, resulting in the formation of a ceramic-metal joint/bond, which may also be referred to as "active braze seal."

Thus, an active metal element is an essential constituent of a braze alloy for employing active brazing. A variety of suitable active metal elements may be used to form the active braze alloy. The selection of a suitable active metal element mainly depends on the chemical reaction with the ceramic (e.g., alpha-alumina of the collar) to form a uniform and continuous reaction layer, and the capability of the active metal element of forming an alloy with a base alloy (e.g. Ni—Ge alloy). An 'active' element will react with the ceramic, forming a reaction layer between the ceramic and the molten braze that will reduce the interfacial energy to such a level that wetting of the ceramic takes place. The active metal element for embodiments herein is often titanium. Other suitable examples of the active metal element include, but are not limited to, zirconium, hafnium, and vanadium. A combination of two or more active metal elements may also be used. In some specific embodiments, the braze alloy includes titanium.

The presence and the amount of the active metal may influence the thickness and the quality of the thin reactive layer, which contributes to the wettability or flowability of the braze alloy, and therefore, the bond strength of the resulting joint. The active metal element is generally present in small amounts suitable for improving the wetting of the ceramic surface, and forming the thin reaction layer, for example, less than about 10 microns. A high amount of the active metal layer may cause or accelerate halide corrosion.

The braze alloy composition may further include at least one alloying element. The alloying element may provide further adjustments in several required properties of the braze alloy, for example coefficient of thermal expansion, liquidus temperature and brazing temperature. In one embodiment, the alloying element can include, but is not limited to, cobalt, iron, chromium, niobium or a combination thereof.

Figure 1:
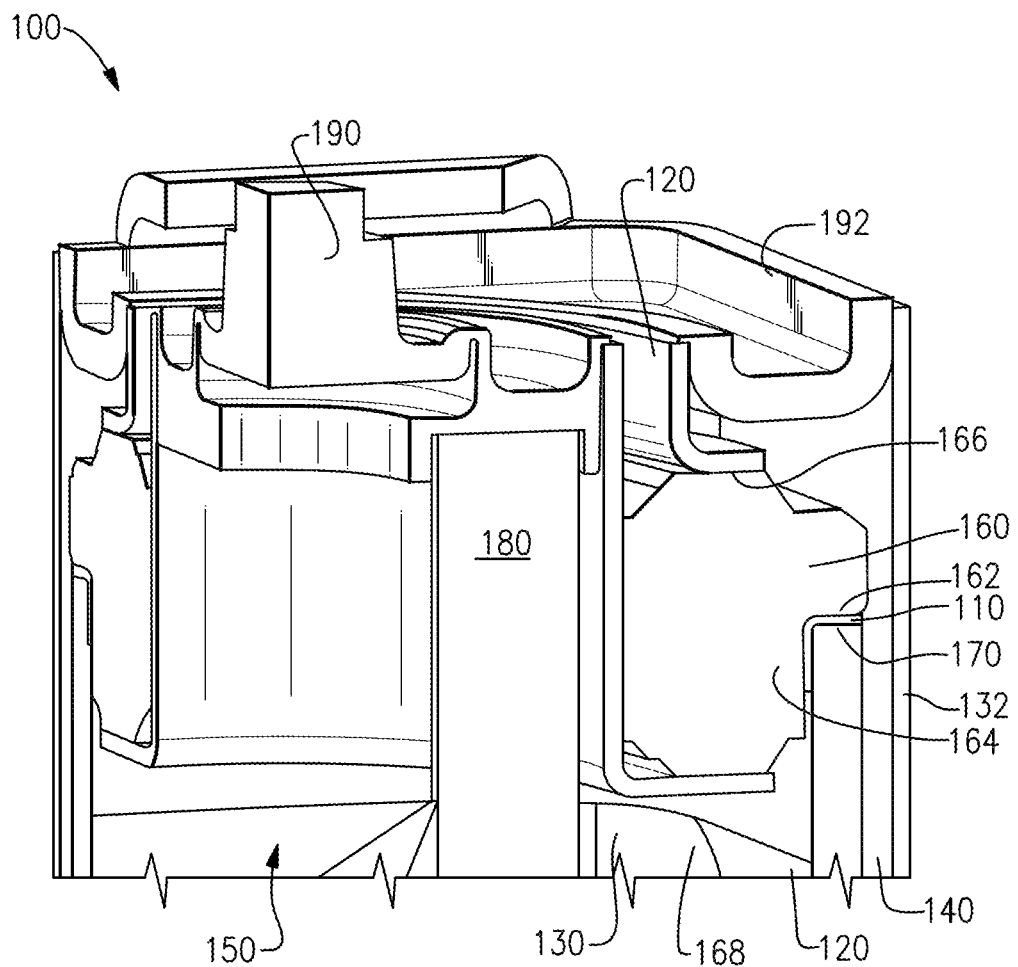
Figure 2A:
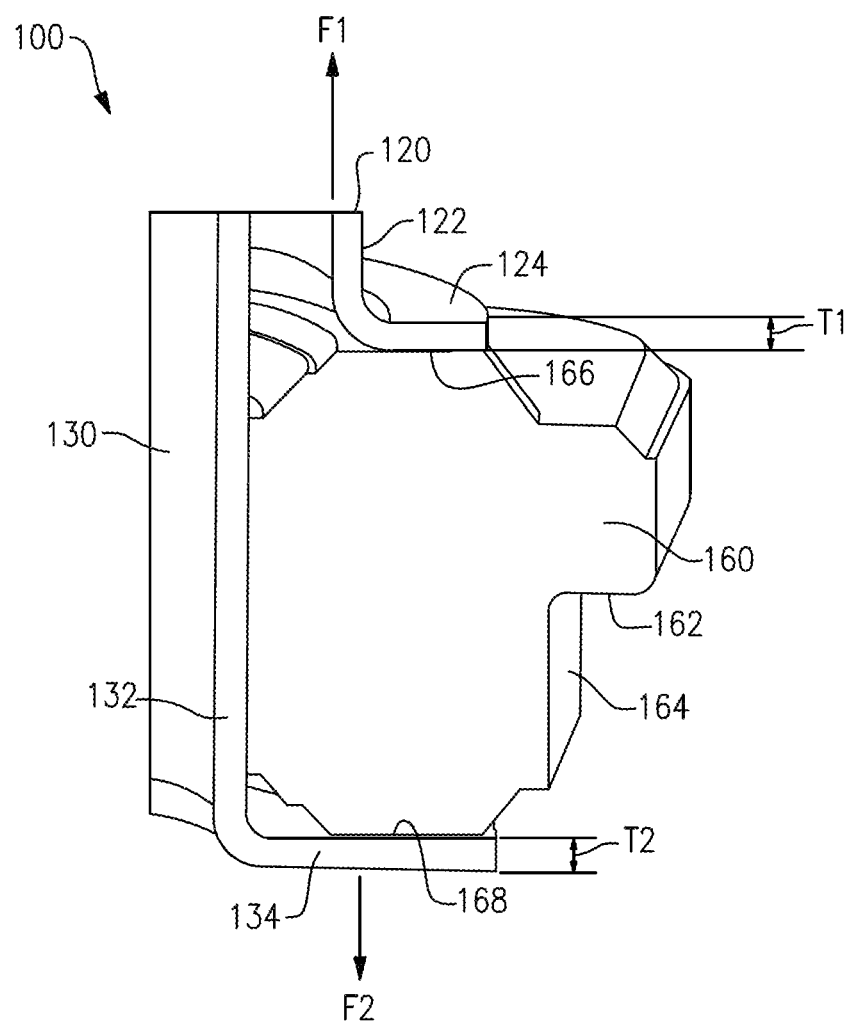
Figure 2B:
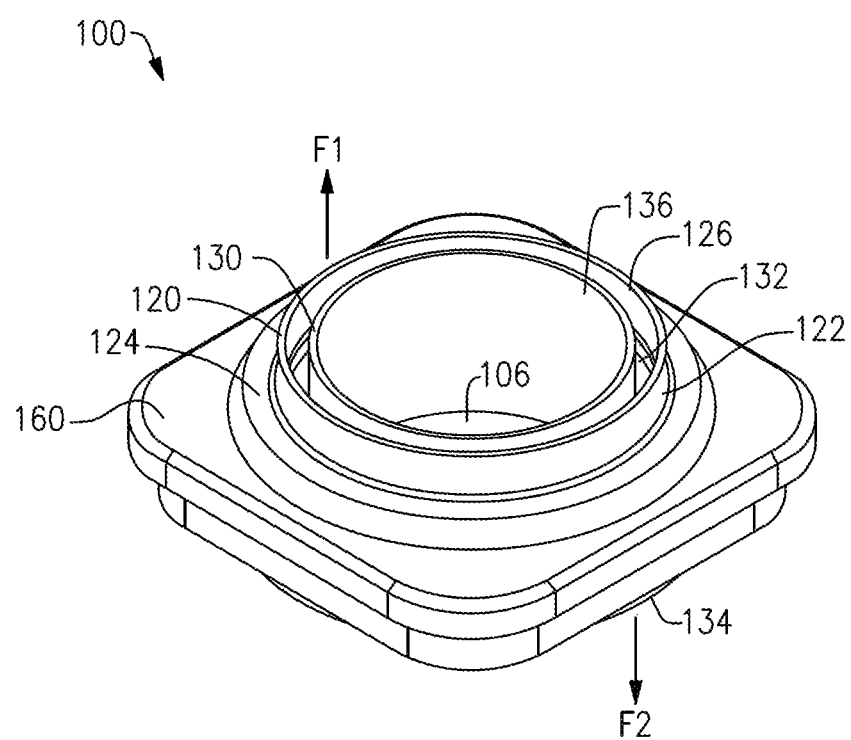

FIGS. 1-2B depict an exemplary embodiment of a NaMx battery cell 100. The cell 100 has an ion-conductive separator tube 122 disposed in a cell case 132. The separator tube 122 may be made of β"-alumina. The tube 122 defines an anodic chamber 140 between the cell case 132 and the tube 122, and a cathodic chamber 150 inside the tube 122. The anodic chamber 140 may be filled with an anodic material (not shown), e.g. sodium. The cathodic chamber 150 may contain a cathode material (not shown) (e.g. nickel and sodium chloride), and a molten electrolyte, usually sodium chloroaluminate (NaAlCl4) along with some other additives.

As shown in FIGS. 1-2B, an electrically insulating collar 160, which may be made of alpha-alumina, zirconia, spinel, yttria, or other ceramic insulator, or combinations thereof, is typically situated at a top end 170 of the tube 122. The insulating collar 160 may include or form an internal, interior or central aperture 106 that is in communication with the interior of the tube 122. A cathode current collector assembly 180 is disposed in the cathode chamber 150, with a cap structure 190, in the top region of the cell 100, as shown in FIG. 1. The collar 160 is fitted onto the top end 170 of the separator tube 122, and is typically sealed by a glass seal 110 in existing battery designs. In one embodiment, the collar 160 includes an upper portion 162 and a lower side portion 164 that abuts against an inner wall of the tube 122, as illustrated in FIGS. 1 and 2A.

In order to seal (e.g., hermetically seal) the cell 100 at the top end (i.e., its upper region), and to ensure the anode and cathode are chemically and physically separate from each other, the cell 100 includes an outer ring 120 and an inner ring 130 which are sealed or joined, respectively, with a top portion 166 and a bottom portion 168 of the collar 160, by means of seals (e.g., a seal resulting from metallization/TCB or active brazing), as shown in FIGS. 1-2B. The outer ring 120 may include or form an internal, interior or central aperture 126 defining a first size and the inner ring 130 may form an internal, interior or central aperture 136 defining a second size that is smaller, in at least one aspect, than the first size of the aperture 126 of the outer ring 120. In some embodiments, the aperture 122 of the collar 160, the aperture 126 of the outer ring 120 and the aperture 136 of the inner ring 130 may be concentric, as illustrated in FIG. 2B. In some embodiments, the aperture 106 of the collar 160, the aperture 126 of the outer ring 120 and the aperture 136 of the inner ring 130 may be substantially circular, as illustrated in FIG. 2B. In some embodiments, the inner 120 and outer 130 rings may be substantially composed of nickel.

As shown in FIG. 1, the inner ring 130 may be operably electrically coupled to the collector assembly 180 via the cap structure 190. Similarly, the outer ring 120 may be operable electrically coupled to the cell case 132 via a bridge member 192. The outer ring 120 and the inner ring 130 may be welded or otherwise sealed to the cell 100, after joining with the collar 160 is completed. The outer ring 120 may be welded to the cell case 132; and the inner ring 130 can be welded to the current collector assembly 180, as shown in FIG. 1. To seal, bond or otherwise couple the inner 120 and outer 130 rings to the collar 160 the components may be temporarily held together with an assembly (e.g., a clamp) or by other techniques, if necessary, until sealing is complete.

The shapes and size of the collar and ring components discussed above with reference to FIGS. 1-2B are only illustrative for the understanding of the cell structure; and are not meant to limit the scope of the invention. The exact position, arrangement, orientation and the like of the components may vary. Moreover, each of the terms "collar" and "ring" is meant to comprise metal and ceramic parts, respectively, of any shape, configuration or arrangement, and in general, all shapes that are compatible with a particular cell design, as discussed below.

Embodiments of the disclosure may include metal rings (e.g., Ni rings) and a ceramic collar (e.g., an alpha alumina collar) sealed by using a braze alloy composition. In such embodiments, the braze alloy may be introduced between rings and collar to form a brazing structure. The alloy may be introduced on either or both of the mating surfaces of the components. The brazing structure may then be heated to form an active braze seal between the rings and collar. In some embodiments, the rings and collar are each joined using an active braze foil (or paste).

As shown in FIGS. 1-2B, a prior art outer Ni ring 120 may include a first upper portion 122 that is operable electrically coupled to the cell case 132 and a second lower portion 124 that is sealed (hermetically sealed), bonded or otherwise coupled to upper portion 66 of the alpha-alumina collar 160. At least the second lower portion 124 of the outer Ni ring 120 may be substantially flat and defines a uniform cross section as it extends in abutment with the top portion 166 of the collar 160. Stated differently, in prior art embodiments the second portion 124 of the outer Ni ring 120 that is bonded or otherwise coupled to the collar 160, and thereby in abutment therewith, defines a substantially constant or uniform thickness T1. As such, any residual stresses on the alumina collar 160 due to thermal expansion mismatch between ceramic collar 160 and the second lower portion 124 of the outer Ni ring 120 (such as the stresses resulting from active brazing) are applied relatively equally along the portions of the upper portion 166 of the alpha-alumina collar 160 and second lower portion 124 of the outer Ni ring 120 that are sealed to one another. For example, in some embodiments the outer Ni ring 120 has a greater coefficient of thermal expansion (CTE) than the alpha-alumina collar 160. In such embodiments, if the upper portion 166 of the alpha-alumina collar 160 and second lower portion 124 of the outer Ni ring 120 are sealed to one another via an active braze, the greater change in the volume of the second lower portion 124 (e.g., along a length thereof) of the outer Ni ring 120 during the active brazing as compared to the upper portion 66 of the alpha-alumina collar 160 will result in the second lower portion 124 "pulling" on the upper portion 166 of the alpha-alumina collar 160, potentially to an extent that the upper portion 166 is "pulled" into a convex shape. In essence, the outer Ni ring 120 will "shrink" after active brazing (i.e., during cooling) to a degree greater than the alpha-alumina collar 160 will "shrink." As such, the significant difference in the CTE of the outer Ni ring 120 and the alpha-alumina collar 160 will cause residual internal stresses at the seal formed by active brazing and, thereby, weaken the bond between the Ni ring 120 and the alpha-alumina collar 160. Further, because the second lower portion 124 of the outer Ni ring 120 includes a constant cross-section or thickness T1, the CTE-resulting stresses will be applied relatively equally along the bond between the upper portion 166 of the alpha-alumina collar 160 and second lower portion 124 of the outer Ni ring 120.

Substantially similar to the prior art outer Ni ring 120, as also shown in FIGS. 1-2B, a prior art inner Ni ring 130 may include a first upper portion 132 that is operable electrically coupled to the collector assembly 180 and a second lower portion 134 that is sealed, bonded or otherwise coupled to the alpha-alumina collar 160. At least the second lower portion 134 of the inner Ni ring 130 may be substantially flat and defines a uniform cross section as it extends in abutment with the bottom portion 68 of the collar 160. Stated differently, in prior art embodiments the second portion 134 of the inner Ni ring 130 that is bonded or otherwise coupled to the collar 160, and thereby in abutment therewith, defines a substantially constant or uniform thickness T2. As such, any residual stresses on the alumina collar 160 due to thermal expansion mismatch between ceramic collar 160 and the second lower portion 134 of the inner Ni ring 130 (such as the stresses resulting from active brazing) are applied relatively equally along the portions of the lower portion 168 of the alpha-alumina collar 160 and second lower portion 124 of the inner Ni ring 130 that are sealed to one another. For example, in some embodiments the inner Ni ring 130 has a greater coefficient of thermal expansion (CTE) than the alpha-alumina collar 160. In such embodiments, if the lower portion 68 of the alpha-alumina collar 160 and second lower portion 134 of the inner Ni ring 130 are sealed to one another via an active braze, the greater change in the volume of the second lower portion 134 (e.g., along a length thereof) of the inner Ni ring 130 as compared to the lower portion 68 of the alpha-alumina collar 160 during the active brace will result in the second lower portion 134 "pulling" on the lower portion 68 of the alpha-alumina collar 160, potentially to an extent that the lower portion 168 is "pulled" into a convex shape. In essence, the inner Ni ring 130 will "shrink" after active brazing (i.e., during cooling) to a degree greater than the alpha-alumina collar 160 will "shrink." As such, the significant difference in the CTE of the inner Ni ring 130 and the alpha-alumina collar 160 will cause residual internal stresses at the seal formed by active brazing and, thereby, weaken the bond between the inner Ni ring 130 and the alpha-alumina collar 160. Further, because the second lower portion 134 of the inner Ni ring 130 includes a constant cross-section or thickness T2, the CTE-resulting stresses will be applied relatively equally along the bond between the lower portion 68 of the alpha-alumina collar 160 and second lower portion 134 of the inner Ni ring 130.

It is noted that depending upon the particular collar 160 embodiment, the thickness direction (T1, T2) may or may not be substantially aligned with the first and second tensile forces F1, F2 applied to the first upper portion 122 of the outer Ni ring 120 and the second lower portion 134 of the inner Ni ring 130, respectively, during the "peel test" described above that is used to experimentally determine or test the bond strength between the Ni rings 120, 130 and the alpha-alumina collar 160, as shown in FIGS. 2A-B.

The internal stresses in or about the seal or bond formed between the outer and inner Ni rings 120, 130 and the alpha-alumina collar 160 caused by the CTE mismatch between the components during active brazing may weaken the seal or bond to an extent that the bond strength is insufficient to withstand normal or expected operating parameter or restrictions of a NaMx cell. As shown in FIGS. 3A-6B, the current disclosure provides advantageous Ni ring and alpha-alumina collar embodiments that are effective in producing reduced or minimal internal stresses in (or about) the seal or bond formed between the outer and inner Ni rings and an alpha-alumina collar caused by the CTE mismatch between the components during active brazing. In this way, the advantageous Ni ring and alpha-alumina collar embodiments may be sealed via active brazing and produce a bond that includes a bond strength that is sufficient to withstand normal or expected operating parameter or restrictions of a NaMx cell. In this way, the disclosed improved advantageous Ni ring and alpha-alumina collar embodiments may be utilized with active brazing techniques in NaMx cells to produce cheaper high performance sodium-based thermal batteries.

Figure 3A:
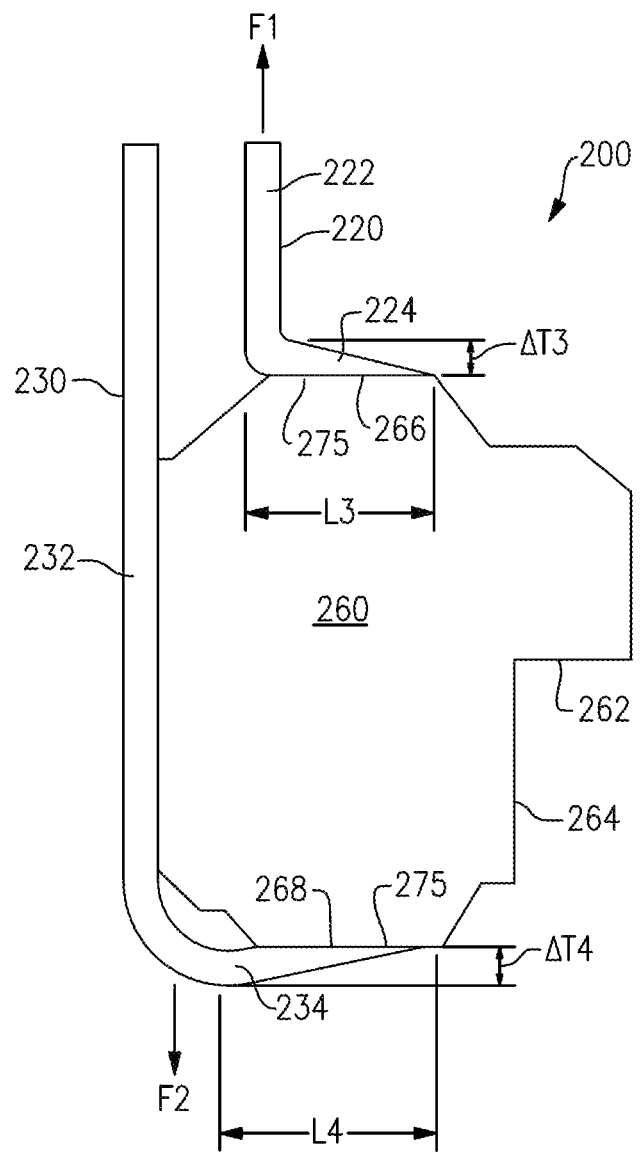
FIGS. 3A-3B are a cross-sectional view and a top view, respectively, of an exemplary first embodiment of exemplary Ni outer and inner rings sealed to an exemplary alpha-alumina collar by active brazing according to the present disclosure.
Figure 3B:
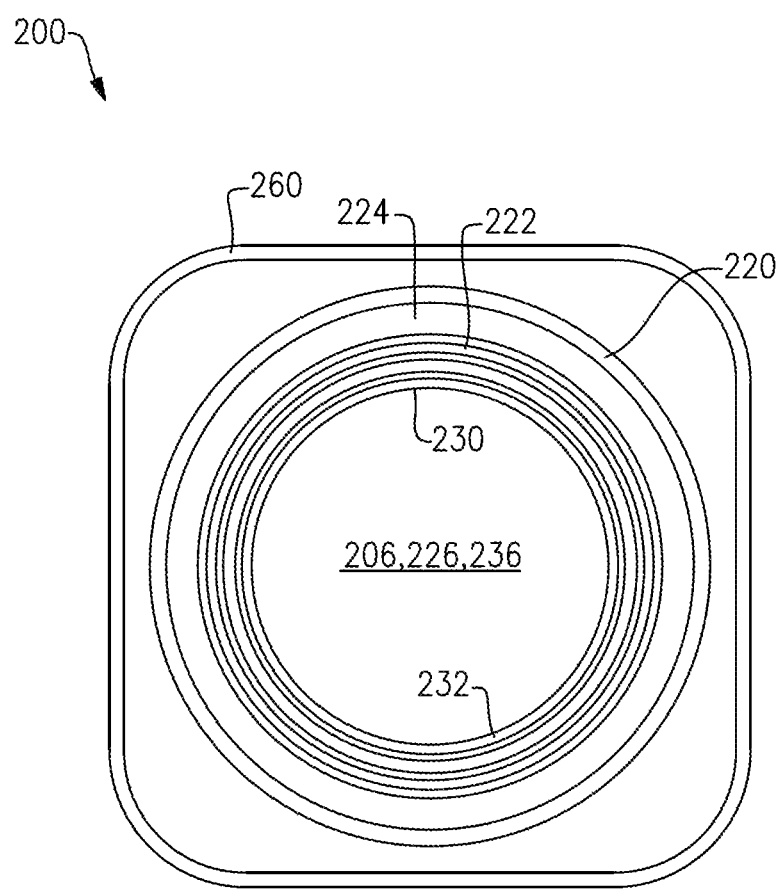

A first embodiment of an exemplary sub-assembly 200 including an exemplary Ni ring and an exemplary alpha-alumina collar sealed or bonded to one another by active brazing according to the present disclosure is shown in FIGS. 3A-B. As shown in FIGS. 3A-B, the exemplary outer Ni ring 220 is bonded to the exemplary alpha-alumina collar 260 via an active braze 275. Specifically, the exemplary outer Ni ring 220 defines a substantially L-shaped cross-section with a first upper vertical portion 222 and a second lower lateral portion 224 orientated substantially perpendicular to the upper portion 222. As noted above, the upper portion 222 of the outer Ni ring 220 may be operably coupled to the case of the battery in which it is installed, such as a NaMx battery. The terms "vertical" and "lateral" are used herein as relative directional terms.

In some embodiments, the "vertical" direction may extend substantially parallel with the first tensile force F1 applied to the first upper portion 222 of the outer Ni ring 220 during the "peel test" described above used to determine or test the bond strength between the outer Ni ring 220 and the alpha-alumina collar 160, as shown in FIG. 3A. Similarly, in some embodiments the "lateral" or "horizontal" direction may be a direction that extends substantially perpendicular to the vertical direction or the direction of the first tensile force F1 of the "peel test". In this way, a bond or seal 275 between the second portion 224 of the outer ring 220 and the alpha-alumina collar 260 extending substantially vertical (i.e., substantially parallel to the first tensile force F1) will primarily experience shear stress by the first tensile force F1 (and during use of the cell in which the sub-assembly 200 is installed). In contrast, a bond or seal 275 between the second portion 224 of the outer ring 220 and the alpha-alumina collar 260 extending laterally (i.e., substantially perpendicular to the vertical direction and the first tensile force F1) will primarily experience tensile stress by the first tensile force F1 (and during use of the cell in which the sub-assembly 200 is installed). Thus, a bond or seal 275 between the second portion 224 of the outer ring 220 and the alpha-alumina collar 260 extending both vertically and laterally (i.e., angled with respect to the vertical and later or horizontal directions) will experience both tensile stress and shear stress by the first tensile force F1 and during use of the cell in which the sub-assembly 200 is installed.

As shown in FIGS. 3A-B the exemplary second portion 224 of the outer Ni ring 220 that is bonded to the exemplary alpha-alumina collar 260 via active brazing 275 extends substantially laterally (i.e., substantially perpendicular to the first tensile force F1). Likewise, the corresponding first surface portion 266 of the exemplary alpha-alumina collar 260 extends substantially laterally. Therefore, the active braze bond 275 sealing the second portion 224 of the outer Ni ring 220 and the first surface portion 266 of the alpha-alumina collar 260 will primarily experience tensile stress by the first tensile force F1 and during use of the cell in which the sub-assembly 200 is installed. As is known in the art, active braze bonds 275 may be susceptible to tensile stress or loads. Further, due to Ni including a greater CTE than alpha-alumina the portion of the second portion 224 of the outer Ni ring 220 that is bonded to the alpha-alumina collar via active brazing 275 will "shrink" along its lateral, horizontal or axial length L3 after active brazing 275 to a degree greater than the corresponding portion of the first portion 266 of the alpha-alumina collar 260. Thereby, the CTE mismatch between the alpha-alumina collar 260 and the outer Ni ring 220 yields residual stresses that, if great enough, can lead to cracking in alumina and lower joint strength between collar 260 and outer ring 220 (i.e., make the braze bond 275 more susceptible the first tensile force F1 and the loads experienced during use in a cell (e.g., tensile loads)). For example, the second portion 224 of the outer Ni ring 220 may "shrink" to such an extent that the second portion 224 "pulls" the first surface portion 266 of the alpha-alumina collar 260 into a convex shape.

To reduce residual stresses due to CTE mismatch between the outer Ni ring 220 and the alpha-alumina collar 260 resulting from the active braze bond 275, the exemplary illustrated outer Ni ring 220 includes a tapered, narrowed or thinned second portion 224 for bonding to the corresponding first surface portion 266 of the alpha-alumina collar 260, as shown in FIGS. 3A-B. More specifically, as can be seen in FIGS. 3A-B the thickness T3 of the exemplary second portion 224 of the outer Ni ring 220 tapers along its length L3 from the adjacent first portion 222 of the outer Ni ring 220. The variation or change in thickness ΔT3 (e.g., amount of a taper) may depend upon the thickness T3 of the first portion 222 of the outer Ni ring 220 or the thickness T3 of the first surface portion 266 that is not tapered. For example, at least a portion of the second portion 224 of the outer Ni ring 220 may include a taper ΔT3 of about 400 micrometers (e.g., from about a 500 micrometer thickness T3 to about 100 micrometers). It is noted that the taper ΔT3 of the second portion 224 of the outer Ni ring 220 may or may not be a smooth taper, constant taper or necessarily thinner at one end of the taper as compared to another. Stated differently, the second portion 224 of the outer Ni ring 220 may include any type, shape or design that includes a thin portion (as compared to a thicker portion) at the portion of the outer Ni ring 220 (e.g., the second portion 224) that is active braze bonded 275 to the alpha-alumina collar 260. The taper ΔT3 of the portion of the exemplary outer Ni ring 220 active braze bonded 275 to the alpha-alumina collar 260 advantageously includes a reduced amount of material (i.e., Ni) as compared to prior art rings. In this way, the residual stresses resulting from the CTE mismatch between the exemplary outer Ni ring 220 and the exemplary alpha-alumina collar 260 are relatively low (or reduced as compared to prior art configurations). Stated differently, the thickness variation or profile of the exemplary portion of the exemplary outer Ni ring 220 active braze bonded 275 to the exemplary alpha-alumina collar 260 produces a relatively low amount residual stress due to CTE mismatch due to the lesser amount (e.g., volume) of Ni, and thereby relatively few or less severe cracks in the exemplary collar 260 and relatively high joint strength between exemplary collar 260 and exemplary Ni outer ring 220.

As also shown in FIGS. 3A-B, the exemplary inner Ni ring 230 is sealed or bonded to the exemplary alpha-alumina collar 260 via an active braze 275. Specifically, the exemplary inner Ni ring 230 defines a substantially L-shaped cross-section with a first upper vertical portion 232 and a second lower lateral portion 234 orientated substantially perpendicular to the upper portion 232. As noted above, the upper portion 232 of the inner Ni ring 230 may be operably electrically coupled to the cathode current collector assembly 80 of the battery in which it is installed, such as a NaMx battery.

Substantially similar to the exemplary outer Ni ring 220, the exemplary inner Ni ring 230 includes an exemplary second portion 234 that is bonded to the exemplary alpha-alumina collar 260 via active brazing 275 and that extends substantially laterally (i.e., substantially perpendicular to the second tensile force F2). Likewise, the corresponding exemplary second surface portion 268 of the exemplary alpha-alumina collar 260 extends substantially laterally. Therefore, the active braze bond 275 sealing the second portion 234 of the exemplary inner Ni ring 230 and the exemplary second surface portion 268 of the exemplary alpha-alumina collar 260 will primarily experience tensile stress by the second tensile force F2 and during use of the cell in which the sub-assembly 200 is installed. The CTE mismatch between the alpha-alumina collar 260 and the inner Ni ring 230 may yield residual stresses that, if great enough, can lead to cracking in alumina and lower joint strength between collar 260 and inner ring 230 (i.e., make the braze bond 275 more susceptible the second tensile force F2 and loads experienced during use in a cell (e.g., tensile loads)).

To reduce residual stresses due to CTE mismatch between the exemplary inner Ni ring 230 and the exemplary alpha-alumina collar 260 resulting from the active braze bond 275, the exemplary illustrated exemplary inner Ni ring 230 includes a tapered, narrowed or thinned exemplary second portion 234 for bonding to the corresponding second surface portion 268 of the alpha-alumina collar 260, as shown in FIGS. 3A-B. More specifically, as can be seen in FIGS. 3A-B the thickness T4 of the second portion 224 of the inner Ni ring 230 includes a variation or tapers along its length L4 from the adjacent first portion 232 of the inner Ni ring 230. The change in thickness ΔT4 or amount of taper may depend upon the thickness T4 of the first portion 232 of the inner Ni ring 230 or the thickness T4 of the second portion 234 that is not tapered. For example, at least a portion of the second portion 234 of the inner Ni ring 230 may include a taper ΔT4 of about 400 micrometers (e.g., from about a 500 micrometer thickness T3 to about 100 micrometers). It is noted that the taper ΔT4 of the second portion 234 of the inner Ni ring 230 may or may not be a smooth taper, constant taper or necessarily thinner at one end of the taper as compared to another. Stated differently, the second portion 234 of the inner Ni ring 230 may include any type, shape or design that includes a thin portion (as compared to a thicker portion) at the portion of the inner Ni ring 230 (e.g., the second portion 234) that is active braze bonded 275 to the alpha-alumina collar 260. The thickness variation or taper ΔT4 of the portion of the inner Ni ring 230 active braze bonded 275 to the alpha-alumina collar 260 advantageously includes a reduced amount of material (i.e., Ni) as compared to prior art rings. In this way, the residual stresses resulting from the CTE mismatch between the inner Ni ring 230 and the alpha-alumina collar 260 are relatively low (or reduced as compared to prior art configurations). Stated differently, the thickness profile of the exemplary portion of the exemplary inner Ni ring 230 active braze bonded 275 to the exemplary alpha-alumina collar 260 produces a relatively low amount residual stress due to CTE mismatch due to the lesser amount (e.g., volume) of Ni, and thereby relatively few or less severe cracks in the alumina collar 260 and relatively high joint strength between alumina collar 260 and inner Ni ring 230.

Figure 4A:
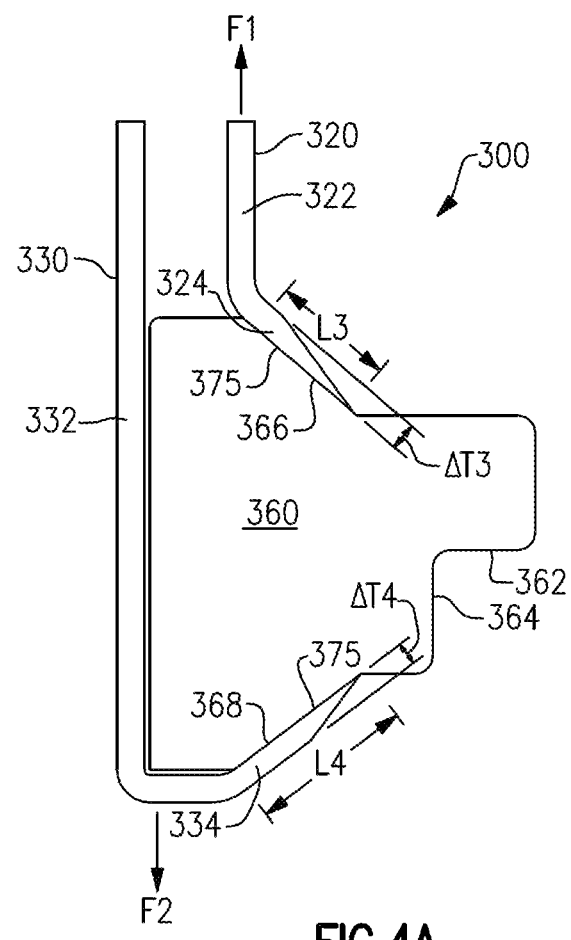
FIGS. 4A-4B are a cross-sectional view and a top view, respectively, of an exemplary second embodiment of exemplary Ni outer and inner rings sealed to an exemplary alpha-alumina collar by active brazing according to the present disclosure.
Figure 4B:
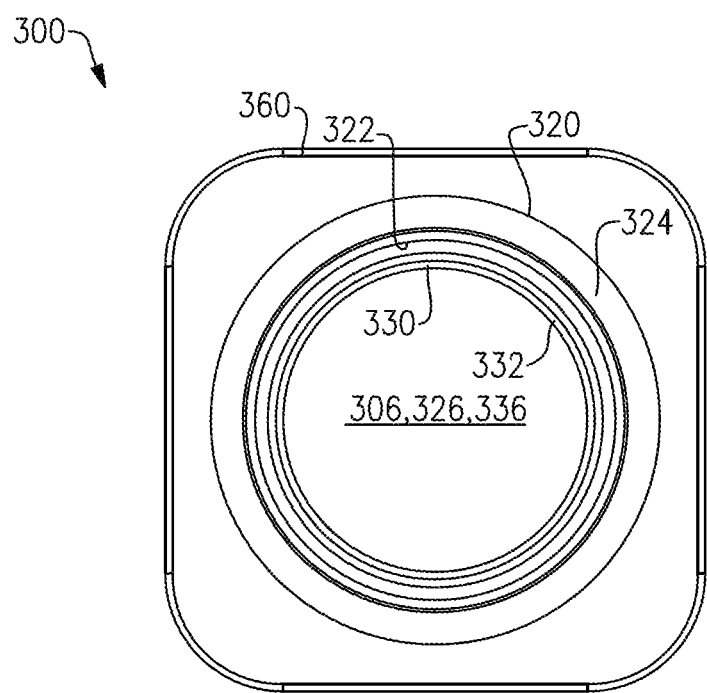

A second embodiment of an exemplary sub-assembly 300 including exemplary Ni rings and an exemplary alpha-alumina collar bonded to one another by active brazing according to the present disclosure is shown in FIGS. 4A-B. The exemplary sub-assembly 300 is similar to the exemplary sub-assembly 200 described above and therefore like reference numerals preceded by the numeral "3," as opposed to "2," are used to indicate like elements. The description above with respect to the other exemplary Ni ring and alpha-alumna collars, and subassemblies thereof, including description regarding alternative embodiments (i.e., modifications, variations or the like), equally applies to sub-assembly 300 (and any alternative embodiments thereof). As shown in FIGS. 4A-B, inter alfa, the exemplary sub-assembly 300 differs from the exemplary sub-assembly 200 of FIGS. 2A-B in the orientation or arrangement of the exemplary second portions 324, 334 of the exemplary outer and inner Ni rings 320, 330 and the exemplary first and second portions 366, 368 of the exemplary alpha-alumna collar 360 that are bonded or sealed therewith via active brazeing 375, respectively.

As shown in the cross-sectional view of FIGS. 4A-B, the exemplary alpha-alumna collar 360 includes exemplary first and second portions 366, 368 for active braze bonding 375 the exemplary second portions 324, 334 of the exemplary outer and inner Ni rings 320, 330 that are oriented on an angle with respect to the first and second "peel" test tensile forces F1, F2. As such, the active braze bonds 375 between the first and second portions 366, 368 of the exemplary alpha-alumna collar 360 and the second portions 324, 334 of the exemplary outer and inner Ni rings 320, 330 extend both vertically and laterally or horizontally (i.e., angled with respect to the vertical and lateral or horizontal directions) and will experience both tensile stress and shear stress by the first and second tensile forces F1, F2 and during use of the cell in which the sub-assembly 300 is installed.

As discussed above with respect to the outer and inner Ni rings 220, 230 of the sub-assembly 200 of FIGS. 3A-B, the exemplary second portions 324, 334 of the exemplary outer and inner Ni rings 320, 330 of the exemplary sub-assembly 200 shown in FIGS. 5A-B include a thickness profile (e.g., a taper) such that the exemplary second portions 324, 334 include a thinning or change in thickness ΔT3, ΔT4. As also discussed above, the thickness profile ΔT3, ΔT4 of the exemplary second portions 324, 334 of the exemplary outer and inner Ni rings 320, 330 reduces the volume of the exemplary outer and inner Ni rings 320, 330 interacting with the exemplary alpha-alumna collar 360 proximate the active braze bonds 375. In this way, the internal stresses resulting from the CTE mismatch between the exemplary outer and inner Ni rings 320, 330 and the exemplary alpha-alumna collar 360 from active brazing is reduced or minimized. Thereby, the bond strength of the active braze bonds 375 between the exemplary outer and inner Ni rings 320, 330 and the exemplary alpha-alumna collar 360 are relatively strong.

The vertically extending aspect of the orientation (the orientation in the directions of the first and second tensile forces F1, F2 of the "peel" test) of the second portions 324, 334 of the outer and inner Ni rings 320, 330 and the first and second portions 366, 368 of the alpha-alumna collar 360, and thereby the active braze bonds 375 therebetween, further increases the bond strength between of the active braze bonds 375. As discussed above, the CTE of the outer and inner Ni rings 320, 330 is significantly greater than the CTE of the alpha-alumna collar 360. As such, after active braze bonding 375 the outer and inner Ni rings 320, 330 will tend to "shrink" towards the interior of the rings 320, 330 in the lateral or horizontal direction (a direction perpendicular to the first and second tensile forces F1, F2). As the active braze bond 375 between the second portion 324 of the outer Ni ring 320 and the first portion 366 of the alpha-alumna collar 360 is positioned at the interior side of the outer Ni ring 320 in the lateral direction, the alpha-alumna collar 360 will "shrink" and press against the alpha-alumna collar 360 as it cools after active braze bonding 375. In this way, the outer Ni ring 320 may be press-fit against the alpha-alumna collar 360 after the active braze bond 375 therebetween is formed. The second portion 334 of the inner Ni ring 330 and the second portion 368 of the alpha-alumna collar 360, and thereby the active braze bond 375 therebetween, is oriented in a substantially similar manner as the outer Ni ring 320 and first portion 366 of the alpha-alumna collar. As a result, the internally-directed lateral forces of the outer and inner Ni rings 320, 330 strengthen the bond strength of the active braze bond 375 between the second portions 324, 334 of the outer and inner Ni rings 320, 330 and the first and second portions 366, 368 of the alpha-alumna collar 360.

Still further, the vertically extending aspect of the orientation of the second portions 324, 334 of the outer and inner Ni rings 320, 330 and the first and second portions 366, 368 of the alpha-alumna collar 360, and thereby the active braze bonds 375 therebetween, further increases the bond strength between of the active braze bonds 375 as the first and second tensile forces F1, F2 of the "peel" test and loads experienced during use in a cell may not act primarily as tensile stresses on the active braze bonds or joints 375. Rather, such forces or stresses may be partially applied to the active braze bonds 375 as shear stress and partially applied to the active braze bonds 375 as tensile stress.

Third and fourth embodiments of exemplary sub-assemblies 400 and 500 including exemplary Ni rings and an exemplary alpha-alumina collars bonded to one another by active brazing according to the present disclosure are shown in FIGS. 5AB and 6A-B, respectively. The exemplary sub-assemblies 400 and 500 are similar to the exemplary sub-assemblies 100 and 200 described above and therefore like reference numerals preceded by the numerals "4" and "5", respectively, as opposed to "2" or "3" are used to indicate like elements. The description above with respect to the other exemplary Ni ring and alpha-alumna collars, and subassemblies thereof, including description regarding alternative embodiments (i.e., modifications, variations or the like), equally applies to sub-assemblies 400 and 500 (and any alternative embodiments thereof). As shown in FIGS. 5A-6B, inter cilia, the exemplary sub-assemblies 400 and 500 differ from the exemplary sub-assembly 300 of FIGS. 4A-B in the orientation or arrangement of the second portions of the outer and inner Ni rings and the first and second portions of the alpha-alumna collar that are bonded or sealed therewith via active brazes, respectively.

As shown in FIGS. 5A-B, the second portions 424, 434 of the exemplary outer and inner Ni rings 420, 430 and the exemplary first and second portions 466, 468 of the exemplary alpha-alumna collar 460, and the active braze bonds or seals 375 therebetween, of the exemplary sub-assembly 400 are oriented substantially vertically (i.e., extend parallel to the first and second tensile forces F1, F2 of the "peel" test). As such, the active braze bonds 475 are subjected primarily or substantially to shear stress by such tensile forces F1, F2 and tensile stresses to the active braze bonds 475 are significantly reduced or eliminated. Thereby, the active braze bonds 475 may include or exhibit relatively strong bond strengths. Further, as the outer and inner Ni rings 420, 430 "shrink" towards the interior of the rings 420, 430 after active brazing more than the alpha-alumna collar 460 "shrinks" in the same directions (due to the CTE mismatch), the outer and inner Ni rings 420, 430 and the first and second portions 466, 468 of the alpha-alumna collar 460, respectively, are press fit. As the second portions 424, 434 of the outer and inner Ni rings 420, 430 and the first and second portions 466, 468 of the alpha-alumna collar 460 are oriented substantially vertically, the forces resulting from the press-fit arrangement are directed substantially entirely in the lateral direction—thereby further strengthen the active braze bonds 475.

The exemplary sub-assembly 500 shown in FIGS. 6A-B is substantially similar to the exemplary sub-assembly 400 of FIGS. 5A-B. A difference between exemplary sub-assembly 500 and exemplary sub-assembly 400 is the positions or arrangement of the exemplary first and second portions 566, 568 of the exemplary alpha-alumna collar 560, and thereby the active braze bonds 575 between the exemplary second portions 524, 534 of the exemplary outer and inner Ni rings 520, 530 and the exemplary alpha-alumna collar 460. In exemplary sub-assembly 400, the exemplary first and second portions 466, 468 of the exemplary alpha-alumna collar 460 are substantially aligned in the vertical direction, as shown in FIGS. 5A-B. To achieve the arrangement, the exemplary second portion 468 of the exemplary alpha-alumna collar 460 (and thereby the inner Ni ring 430 and the active braze bond 475 therebetween) is set in an exemplary channel or groove that extends into the collar 460 in a medial portion of the collar 460. In contrast, as shown in FIGS. 6A-B the exemplary first and second portions 566, 568 of the exemplary alpha-alumna collar 560 are substantially offset or "stepped" in the vertical direction. In such an arrangement, the exemplary alpha-alumna collar 560 may be thinner in the lateral direction while still providing a relatively large or sufficient amount of collar 560 material on the interior of the outer and inner Ni rims 520, 530. Thereby, the exemplary sub-assembly 500 may provide a particularly robust arrangement.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A sub-assembly for at least partially sealing a cell of a sodium-based thermal battery, the sub-assembly including:
    an outer metal ring defining a first aperture and including a first portion and a second portion, the second portion defining a length and a thickness, wherein the thickness of the second portion tapers along its length;
    an inner metal ring defining a second aperture that is smaller than the first aperture of the outer metal ring and including a third portion and a fourth portion, the fourth portion defining a length and a thickness, wherein the thickness of the fourth portion tapers along its length; and
    a ceramic collar defining a third aperture and including a first surface and a second surface,
    wherein at least a portion of the second portion of the outer metal ring is joined to the first surface of the ceramic collar by active brazing, wherein at least a portion of the fourth portion of the inner metal ring is joined to the second surface of the ceramic collar by active brazing, and wherein the ceramic collar substantially electrically insulates the outer and inner metal rings.

2. The sub-assembly of claim 1, wherein the inner and outer metal rings are substantially nickel, wherein the ceramic collar is substantially alpha-alumina, and wherein the outer and inner metal rings are hermetically sealed to the ceramic collar by active brazing.

3. The sub-assembly of claim 1, wherein at least one of:
    the first surface of the ceramic collar is a first substantially flat ring-shaped sealing surface, wherein the second portion of the outer metal ring includes a second substantially flat ring-shaped sealing surface, and wherein the first and second sealing surfaces are joined by active brazing; and
    the second surface of the ceramic collar is a third substantially flat ring-shaped sealing surface, wherein the fourth portion of the inner metal ring includes a fourth substantially flat ring-shaped sealing surface, and wherein the third and fourth sealing surfaces are joined by active brazing.

4. The sub-assembly of claim 3, wherein at least one of:
    the second sealing surface of the second portion of the outer metal ring is oriented at an angle with respect to the first portion of the outer metal ring; and
    the fourth sealing surface of the fourth portion of the inner metal ring is oriented at an angle with respect to the third portion of the inner metal ring.

5. The sub-assembly of claim 4, wherein at least one of:
    the second sealing surface of the second portion of the outer metal ring is oriented substantially perpendicular with respect to the first portion of the outer metal ring; and
    the fourth sealing surface of the fourth portion of the inner metal ring is oriented substantially perpendicular with respect to the third portion of the inner metal ring.

6. The sub-assembly of claim 4, wherein at least one of:
    the first sealing surface of the ceramic collar is outwardly facing, and the second sealing surface of the outer metal ring is inwardly facing; and
    the third sealing surface of the ceramic collar is outwardly facing, and the fourth sealing surface of the inner metal ring is inwardly facing.

7. The sub-assembly of claim 6, wherein under normal operating conditions of the sodium-based thermal battery at least one of:
    the size of the second ring-shaped sealing surface of the outer metal ring is smaller than the size of the first ring-shaped sealing surface of the ceramic collar such that the outer metal ring and the ceramic collar are press fit after being joined by active brazing; and
    the size of the fourth ring-shaped sealing surface of the inner metal ring is smaller than the size of the third ring-shaped sealing surface of the ceramic collar such that the inner metal ring and the ceramic collar are press fit after being joined by active brazing.

8. The sub-assembly of claim 3, wherein at least one of:
    the second sealing surface of the second portion of the outer metal ring is substantially parallel with respect to a surface of the first portion of the outer metal ring; and
    the fourth sealing surface of the fourth portion of the inner metal ring is substantially parallel with respect to a surface of the third portion of the inner metal ring.

9. A sodium-based thermal battery including an electrically conductive case and at least one cell with a cathode current collector assembly, the battery including:
    an outer metal ring defining a first aperture and including a first portion and a second portion, the first portion being operably electrically coupled to the case, and the second portion defining a length and a thickness, wherein the thickness of the second portion tapers along its length;
    an inner metal ring defining a second aperture that is smaller than the first aperture of the outer metal ring and including a third portion and a fourth portion, the third portion being operably electrically coupled to the cathode current collector assembly, and the fourth portion defining a length and a thickness, wherein the thickness of the fourth portion tapers along its length; and
    a ceramic collar defining a third aperture and including a first surface and a second surface,
    wherein at least a portion of the second portion of the outer metal ring is sealed to the first surface of the ceramic collar by active brazing, wherein at least a portion of the fourth portion of the inner metal ring is sealed to the second surface of the ceramic collar by active brazing, and wherein the ceramic collar substantially electrically insulates the outer and inner metal rings and thereby the case and the cathode current collector assembly.

10. The battery of claim 9, wherein the inner and outer metal rings are substantially nickel, wherein the ceramic collar is substantially alpha-alumina, and wherein the outer and inner metal rings are hermetically sealed to the ceramic collar by active brazing.

11. The battery of claim 9, wherein at least one of:
    the first surface of the ceramic collar is a first substantially flat ring-shaped sealing surface, wherein the second portion of the outer metal ring includes a second substantially flat ring-shaped sealing surface, and wherein the first and second sealing surfaces are sealed by active brazing; and the second surface of the ceramic collar is a third substantially flat ring-shaped sealing surface, wherein the fourth portion of the inner metal ring includes a fourth substantially flat ring-shaped sealing surface, and wherein the third and fourth sealing surfaces are sealed by active brazing.

12. The battery of claim 11, wherein at least one of:

the second sealing surface of the second portion of the outer metal ring is oriented at an angle with respect to the first portion of the outer metal ring; and the fourth sealing surface of the fourth portion of the inner metal ring is oriented at an angle with respect to the third portion of the inner metal ring.

13. The battery of claim 11, wherein at least one of:

the first sealing surface of the ceramic collar is outwardly facing, and the second sealing surface of the outer metal ring is inwardly facing; and the third sealing surface of the ceramic collar is outwardly facing, and the fourth sealing surface of the inner metal ring is inwardly facing.

14. A method of at least partially sealing a cell of a sodium-based rechargeable thermal battery including a case and a cathode current collector assembly, the method including:

obtaining an outer metal ring defining a first aperture and including a first portion and a second portion, the second portion defining a length and a thickness, wherein the thickness of the second portion tapers along its length;

obtaining an inner metal ring defining a second aperture that is smaller than the first aperture of the outer metal ring and including a third portion and a fourth portion, the fourth portion defining a length and a thickness, wherein the thickness of the fourth portion tapers along its length;

obtaining an electrically insulating ceramic collar defining a third aperture and including a first surface and a second surface;

active brazing at least a portion of the second portion of the outer metal ring to the first surface of the ceramic collar to seal the outer metal and the ceramic collar;

active brazing at least a portion of the fourth portion of the inner metal ring to the second surface of the ceramic collar to seal the inner metal and the ceramic collar;

operably electrically coupling the outer metal ring to the case; and operably electrically coupling the inner metal ring to the cathode current collector assembly.

15. The method of claim 14, wherein the inner and outer metal rings are substantially nickel, wherein the ceramic collar is substantially alpha-alumina, and wherein the outer and inner metal rings are hermetically sealed to the ceramic collar by active brazing.

16. The method of claim 14, wherein at least one of:

the first surface of the ceramic collar is a first substantially flat ring-shaped sealing surface, wherein the second portion of the outer metal ring includes a second substantially flat ring-shaped sealing surface, and wherein active brazing at least a portion of the second portion of the outer metal ring to the first surface of the ceramic collar includes active brazing the first and second sealing surfaces; and the second surface of the ceramic collar is a third substantially flat ring-shaped sealing surface, wherein the fourth portion of the inner metal ring includes a fourth substantially flat ring-shaped sealing surface, and wherein active brazing at least a portion of the fourth portion of the inner metal ring to the second surface of the ceramic collar includes active brazing the third and fourth sealing surfaces.

17. The method of claim 16, wherein at least one of:

the second sealing surface of the second portion of the outer metal ring is oriented at an angle with respect to the first portion of the outer metal ring; and the fourth sealing surface of the fourth portion of the inner metal ring is oriented at an angle with respect to the third portion of the inner metal ring.

* * * * *